May 31, 1949.  E. J. RAPP ET AL  2,471,702
MOLDING AND PACKAGING MACHINERY
Filed Jan. 25, 1946  5 Sheets-Sheet 4

INVENTORS.
Earl J. Rapp,
Harold R. Coon, Sr.
By Bair & Freeman
Attys.

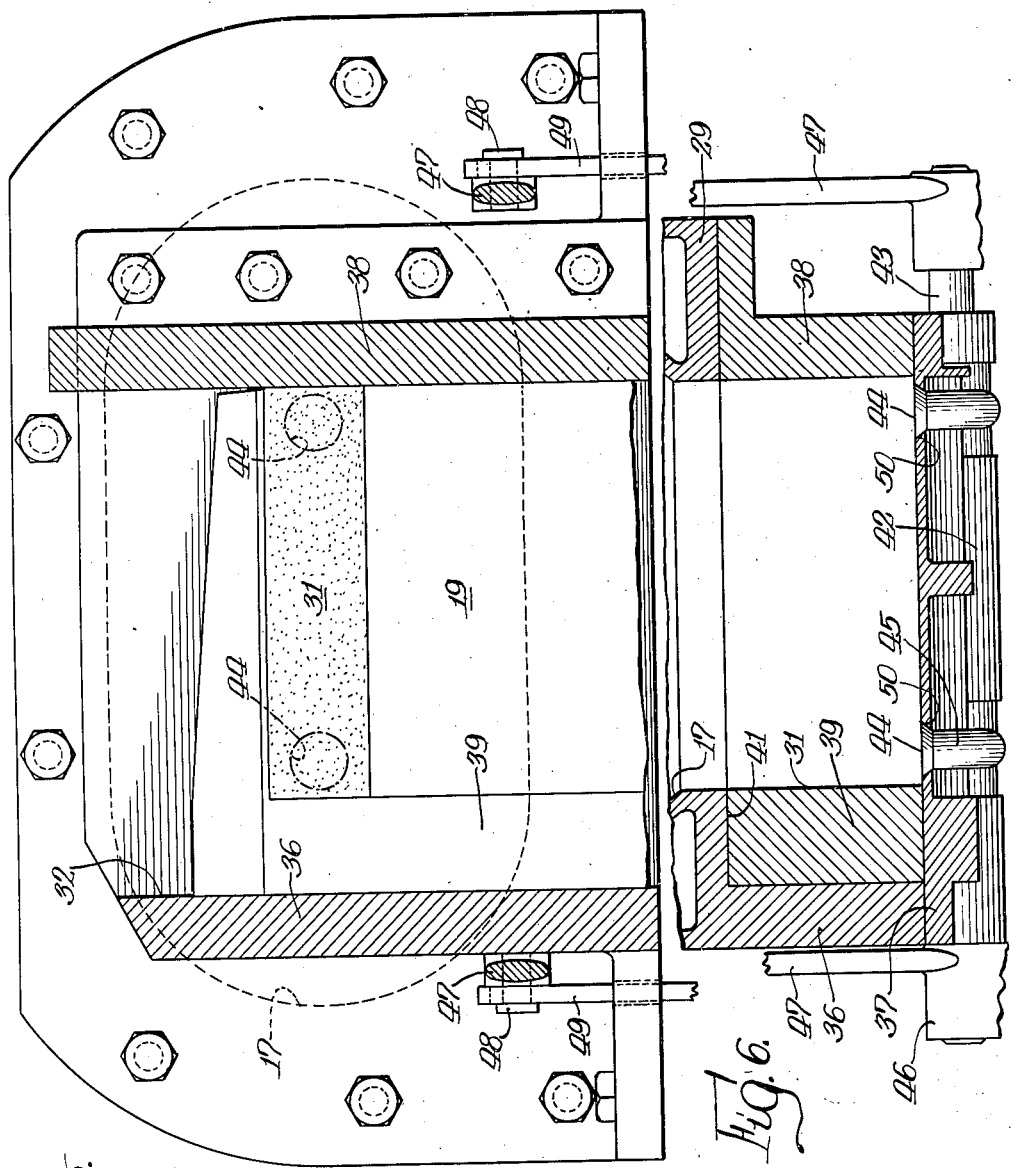

Patented May 31, 1949

2,471,702

UNITED STATES PATENT OFFICE 2,471,702

MOLDING AND PACKAGING MACHINERY

Earl J. Rapp and Harold R. Coon, Sr., Toledo, Ohio, assignors to Lynch Corporation, a corporation of Indiana Application January 25, 1946, Serial No. 643,244

4 Claims. (Cl. 31—8)

This invention relates to molding and packaging machinery and particularly to machinery for molding and packaging semi-viscous or semi-plastic materials such as butter, lard or the like, in print form.

The machine to which the invention is specifically applied is substantially shown in our co-pending application, Serial Number 593,708, filed May 14, 1945, and assigned to the Lynch Manufacturing Corporation.

One of the problems which has been prevalent in the automatic packaging of materials such as butter, cheese or lard, has been the difficulty of maintaining a constant weight for each print of the material made. This is due mainly to entrapped air in the forward end of the mold. Actually, the air is usually entrapped at the corners of the mold because, as the material is pressed forward in the die by the printer worm, the center portion advances faster than the sides because of the frictional engagement with the sides of the mold cavity. This is objectionable, particularly in long flat prints. If this objection is not overcome, underweight prints result. Placing a small extra amount of the material in each mold proved unsatisfactory because the amount of entrapped air varied and required considerable running oversize to insure that a few prints did not fall undersize.

This invention, therefore, has as its main object the accurate control of the amount of material molded on every molding operation of the molding machine and the elimination of air pockets in the molding process.

Another object of the invention is to provide an improved valve structure for the mold of a packaging machine for molding semi-viscous or semi-plastic materials.

A further object of the invention is to provide an improved system for venting the mold of such a machine at each molding operation.

Still another object of the invention is to properly time an air venting system in a packaging machine for semi-viscous or semi-plastic materials, so that there is very little waste of material due to the venting operation, even though substantially all entrapped air is effectively removed.

Still another object of the invention is to provide a mold which is easier to machine and assemble with respect to the remainder of the apparatus.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Figure 1:
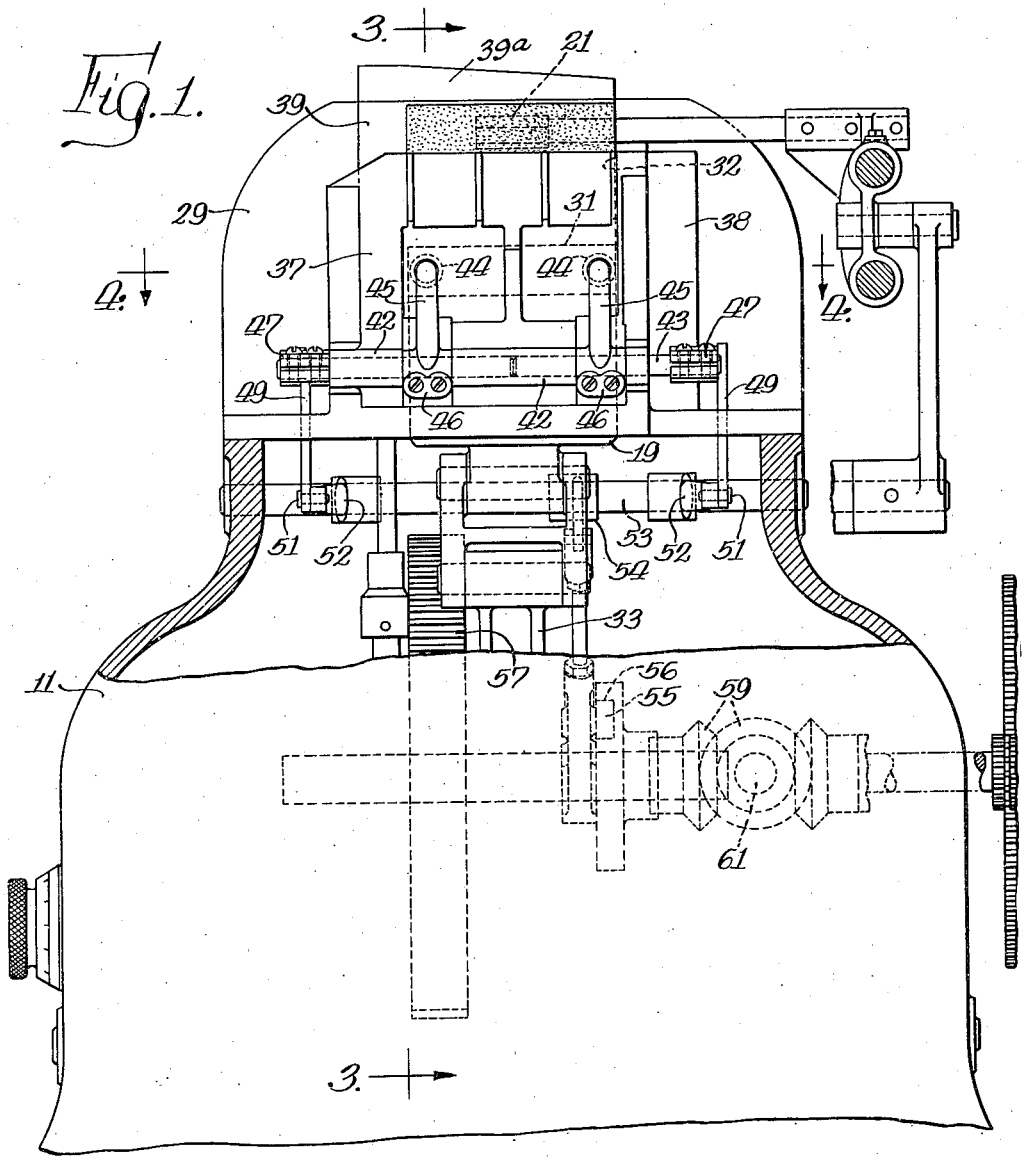
Fig. 1 is a view showing parts of a molding and packaging machine in elevation and parts in section and illustrates the application of a preferred embodiment of the invention to a molding and packaging machine.
Figure 2:
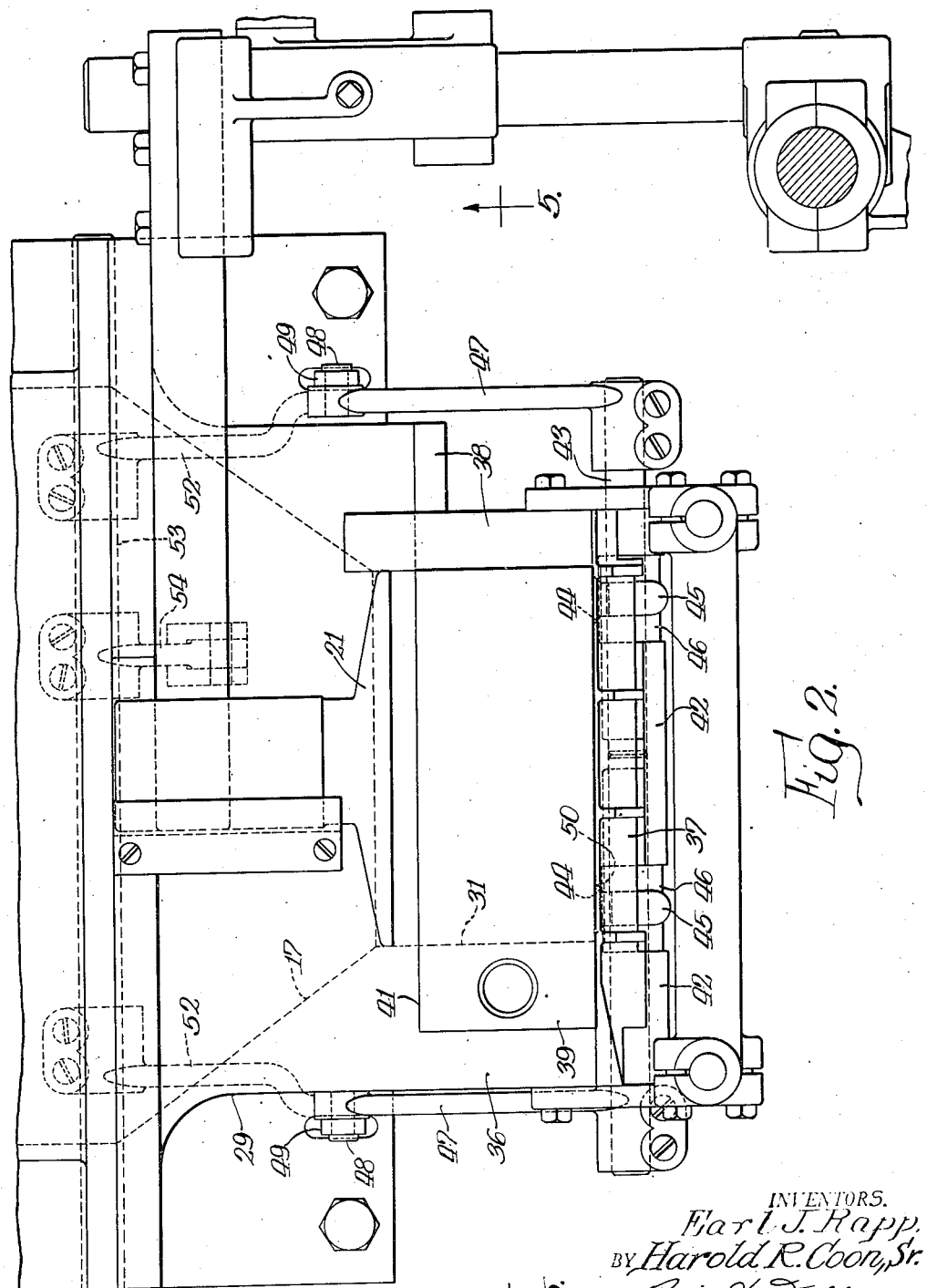
Fig. 2 is a top plan view of a portion of the packaging machine illustrated in Fig. 1.
Figure 4:
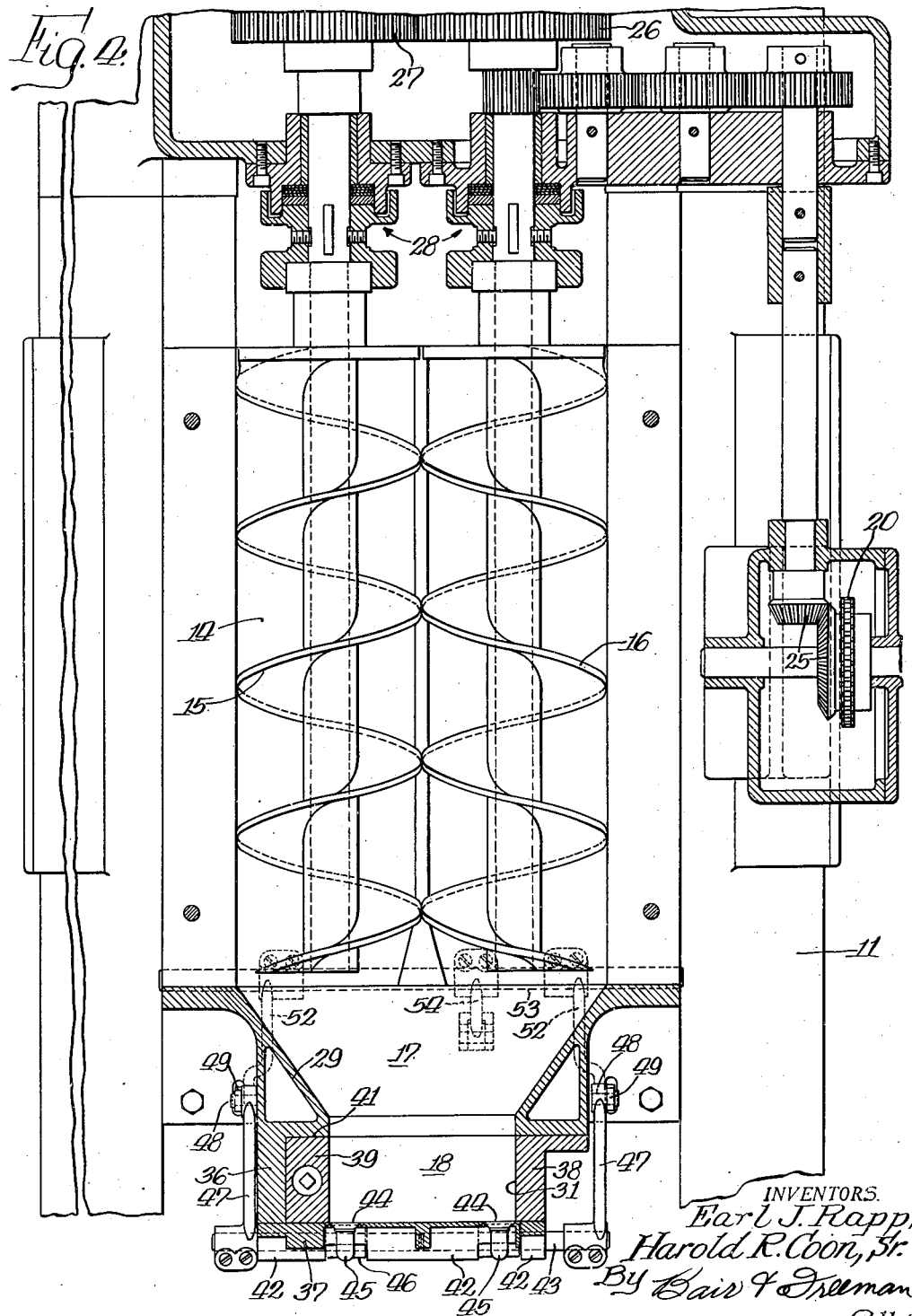

Fig. 4 is a horizontal sectional view of a portion of the machine taken on line 4—4 of Fig. 1; and Figs. 5 and 6 are detailed views of the parts forming the mold cavity, Fig. 5 being a sectional view taken on line 5—5 of Fig. 2.

Referring specifically to the drawings for a detailed description of the invention, numeral 11 designates a supporting base for the machine, which houses generally the actuating gears and levers for the molding and packaging elements. In these drawings, only the molding portion of the packaging machine is illustrated, because the present invention is confined to improvements therein.

Mounted above the supporting base is a hopper 12, into which the material to be packaged is charged and fed into a chamber 14 containing spiral feeding members 15 and 16, a compressing chamber 17, a mold casing generally indicated at 18, an ejecting elevator 19 and a ram 21 for removing the mold or print from the elevator 19.

The spiral feed members 15 and 16, which are preferably formed of metal are driven by a chain 20 which rotates pinion gears 25 to rotate the spiral feed member 16. Feed member 16 has a gear 26 thereon which engages a gear 27 on the feed member 15 and thus the feed member 15 is rotated when feed member 16 is operated by gear 25. Suitable bearings and packings, generally indicated at 28, are provided for the spiral feed members 15 and 16. The spiral feed members 15 and 16 are recurrently rotated to feed a charge of the material to the mold casing 18 and thereafter stop until a print has been discharged and mold casing 18 has returned to its material receiving position, whereupon the feed members 15 and 16 are again rotated to deliver another charge of material.

Figure 3:
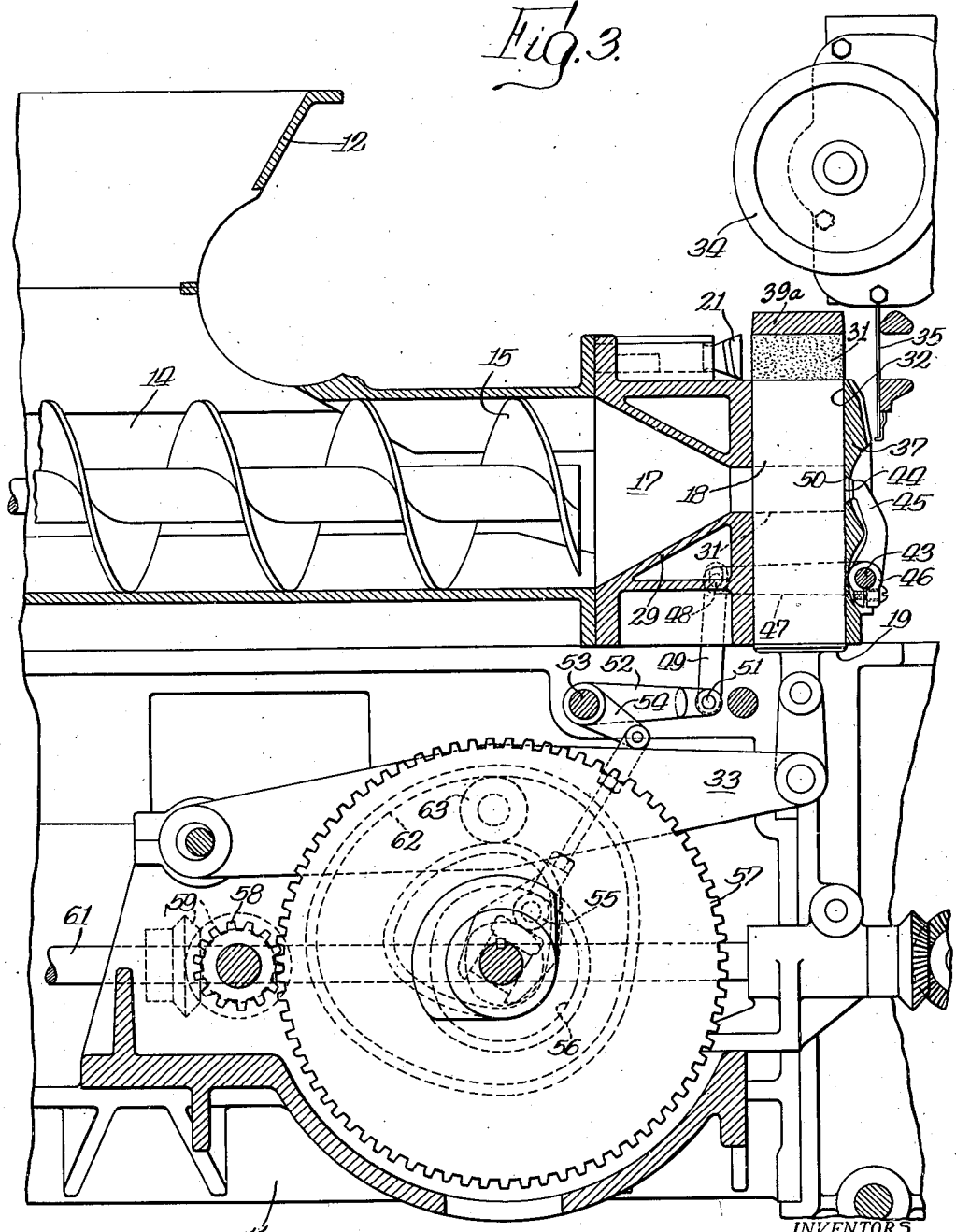
Fig. 3 is a vertical sectional view of a portion of the machine taken on line 3—3 of Fig. 1.

Mounted on the base 11 is a casting 29 in which the compressing chamber 17 is formed. The chamber 17 tapers inwardly from the feed members 15 and 16 and is aligned with a cavity 31 in mold casing 18, as best shown in Figs. 1 and 3. The mold cavity 31 is formed in the mold casing 18 and is preferably rectangular in cross section and elongate in a horizontal direction. The mold casing 18 is mounted for vertical reciprocating sliding movement in an open ended guide 32 in which the mold casing 18 fits snugly and substantially air tight. The lower end of the mold casing 18 is connected to the elevator 19 and the elevator 19 is pivotally connected to a link 33 which imparts recurrent reciprocating motion to the elevator 19 and mold casing 18 in a manner hereinafter described. When the mold cavity 31 is filled with material the mold casing 18 is raised and the print is ejected by the ram 21. For this purpose, the mold cavity 31 is open at its front and rear ends. A wheel 34, containing wax paper 35 is provided for wrapping the ejected print, but since this feature forms no part of the present invention, further description is dispensed with.

Referring specifically to Figs. 4 to 6 inclusive, the left hand side of the casting 29, in which the compressing chamber 17 is formed, is provided with an extension 36 which abuts against a front plate 37, hereinafter described in greater detail. The other side of the casting 29 terminates at the edge of the compression chamber 17 and an L-shaped member 38 is interposed between the casting 29 and the front plate 37. The L-shaped member 38 forms a guide for one side of the elevator 19 and the mold casing 18 and extension 36 provides the guide on the other side for the elevator and mold casing 18. A bar 39 slides against the extension 36 and a shoulder 41 on casting 29 and connects to a horizontal member 39a forming the upper surface of the mold cavity 31. It is clear that the casting 29 including the extension 36 and the L-shaped member 38 are very easy to machine and assemble.

The front plate 37 is provided with bearings 42 in which are journalled a rock shaft 43. Formed in the front wall near the outer edges of the mold cavity 31 are substantially round vent openings 44 communicating with the interior of the mold cavity 31 and with the atmosphere. The round vent openings 44 are adapted to be opened or closed by rockable valves 45 which are secured to the rockable shaft 43 by screw tightened split collars 46. Valve seats 50 are provided on the front plate.

The shaft 43 is recurrently rocked in properly timed relationship to open and close the valves 45 by means of an arm 47 secured to the shaft 43 at one end and pivoted at 48 at its other end to another arm 49 pivoted at one end at 48 and the other end at 51. A third arm 52 is pivoted at 51 and is attached to a recurrently rockable shaft 53 at its other end. A crank arm indicated at 54 is also secured to shaft 53 and is rocked by connection to a roller 55 which rides in a cam track 56 rotated by a large gear wheel 57.

The large gear wheel 57 is driven by a smaller gear wheel 58 which is in turn driven by bevel gears 59 which are driven by a power shaft 61.

In order to insure that all entrapped air is removed from the mold cavity 31 when the material is forced into the cavity, the cam track 56 maintains the valves 45 in the open position during most of the time that the spiral feeding members are feeding material into the mold cavity. Valve opening and closing are preferably timed relative to the position of the mold casing 18. This is accomplished by imparting the proper contour to a cam track 62 in which a roller 63 travels, which roller is secured to arm 33 and reciprocates the same. The large gear 57 rotates both the cam track 56 and the cam track 62, thus insuring proper timing. Just before the mold casing 18 starts to move upwardly to the ejecting position, the cam track 56 effects closing of the valves to atmosphere. As soon as the mold cavity 31 reaches the position for filling, the feeding members 15 and 16 start to rotate and force material into the mold cavity tending to compress air therein. However, simultaneously with the initiation of feeding, the cam track 56 opens the valves 45 and any air in the mold cavity 31 is exhausted through the valve ports 44. Just prior to the time the mold casing 18 starts to move upwardly due to the contour of trackway 62, and the feeding members 15 and 16 stop rotation of the cam 56 effects closing of the valves 45 so that no material is forced into the ports 44.

From the foregoing it will be apparent that we have provided an improved molding and packaging machine in which all entrapped air at the sides of the mold cavity are removed on each molding operation.

Furthermore, we have provided an improved, easily machined assembly for forming the compressing chamber and the mold cavity.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In a machine for molding semi-plastic materials into prints, means for advancing material under pressure, a box-like open-ended mold casing, a front plate which with the mold casing forms a mold cavity for containing a predetermined amount of said material, said mold case being movable for recurrent disposal in the path of said advancing means to receive said material, a plurality of valve ports near the sides of said mold cavity in said front plate, a plurality of valves for opening and closing said ports, valve seats on said front plate for said valves, means for moving said mold casing between said material receiving position and a second position wherein prints can be ejected from said mold casing, said advancing means being rendered ineffective during movement of the mold casing and being rendered effective when said mold casing is returned to its material receiving position, a rotatable shaft for actuating said valves, means for rotating said shaft, means for controlling said shaft rotating means to coordinate said shaft rotation with said mold movement so that said valves will be open when said mold is in a material receiving position for thereby venting said mold, and a ram for discharging a print from said mold casing when said casing is in said second position.

2. In a machine for molding semi-plastic material into prints, means for advancing the material under pressure, a box-like open-ended mold casing, a front plate which with the mold casing forms a mold cavity for containing a predetermined amount of said material, said mold case being movable for recurrent disposal in the path of said advancing means to receive said material, a plurality of valve ports near the sides of said mold cavity in said front plate, a plurality of valves for opening and closing said ports, valve seats on said front plate for said valves, means for moving said mold casing between said material receiving position and the second position wherein prints can be ejected from said mold casing, a rotatable shaft for actuating said valves, means for rotating said shaft, and means for controlling said shaft rotating means to coordinate said shaft with said mold movement so that said valves will be open when said mold is in a material receiving position for thereby venting said mold and said valves will be closed while said mold casing is being moved.

3. In a machine for molding semi-plastic materials into print form, means for advancing the material under pressure, a box-like open ended mold casing having a mold cavity therein for containing a predetermined amount of material and recurrently disposed in the path of the advancing means to receive said material, a front plate for said mold cavity, a plurality of valve ports near the sides of said mold cavity in said front plate, a plurality of valves for opening and closing said ports, valve seats on said front plate for said valves, a rotatable shaft journalled on said front plate for imparting movement to said valves to open and close the same and means for rotating said shaft.

4. In a machine for molding semi-plastic materials into print form, means for advancing the material under pressure, a box-like open ended mold casting having a mold cavity therein for containing a predetermined amount of material and recurrently disposed in the path of the advancing means to receive said material, a front plate for said mold cavity, a plurality of valve ports near the sides of said mold cavity in said front plate, a plurality of valves for opening and closing said ports, valve seats on said front plate for said valves, a rotatable shaft journalled on said front plate for imparting movement to said valves to open the valves while the mold cavity is being filled and to close the valves at all other times and means for rotating said shaft.

EARL J. RAPP.
HAROLD R. COON, Sr.

REFERENCES CITED

The following references are of record in the file of this patent:

UNITED STATES PATENTS

| Number | Name | Date |
|--------|------|------|
| 434,806 | Reed | Aug. 19, 1890 |
| 452,599 | Dooley | May 19, 1891 |
| 2,064,514 | Balz | Dec. 14, 1936 |
| 2,258,288 | Heft et al. | Oct. 7, 1941 |
| 2,375,693 | Russell et al. | May 8, 1945 |